United States Patent [19]

Salensky

[11] Patent Number: 4,469,521

[45] Date of Patent: Sep. 4, 1984

[54] CORROSION INHIBITIVE PIGMENTS

[75] Inventor: George A. Salensky, Whitehouse Station, N.J.

[73] Assignee: Union Carbide Corporation, Danbury, Conn.

[21] Appl. No.: 426,724

[22] Filed: Sep. 29, 1982

[51] Int. Cl.$^3$ .............................................. C04B 1/00
[52] U.S. Cl. ................................ 106/296; 106/14.05; 106/288 B; 106/306; 423/599; 423/605
[58] Field of Search ..................... 106/306, 296, 14.05, 106/14.44, 14.39, 290, 288 B; 423/599

[56] References Cited

U.S. PATENT DOCUMENTS

| | | | |
|---|---|---|---|
| 2,028,980 | 1/1936 | Korinth et al. | 134/78 |
| 2,430,589 | 11/1947 | Sloan | 106/302 |
| 2,703,354 | 3/1955 | Wainer | 423/599 |
| 3,380,836 | 4/1968 | Robinson | 106/14.39 |
| 3,992,219 | 11/1976 | Clark | 106/291 |
| 4,006,041 | 2/1977 | Fabregas et al. | 148/6.16 |
| 4,049,790 | 9/1977 | Horowitz et al. | 423/599 |
| 4,156,613 | 5/1979 | Hund et al. | 106/14.39 |
| 4,159,207 | 6/1979 | Nuss | 106/293 |
| 4,285,726 | 8/1981 | Hund et al. | 106/14.05 |
| 4,388,118 | 6/1983 | Eppler | 106/306 |
| 4,420,340 | 12/1983 | Mohr et al. | 106/288 B |

FOREIGN PATENT DOCUMENTS

| | | | |
|---|---|---|---|
| 49-114633 | 11/1974 | Japan | 106/296 |
| 227023 | 1/1925 | United Kingdom | 106/290 |

OTHER PUBLICATIONS

Kirk–Othmer–Encyclopedia of Chemical Technology, vol. 8, p. 744.

Primary Examiner—Helen M. McCarthy
Attorney, Agent, or Firm—Bernard Francis Crowe

[57] ABSTRACT

Corrosion inhibitive pigments are prepared by sintering manganomanganic oxide with stoichiometric amounts of oxides of calcium, zinc, barium, magnesium, or strontium or a mixture of calcium and boric acid at a temperature of about 500° to about 800° C.

11 Claims, No Drawings

CORROSION INHIBITIVE PIGMENTS

BACKGROUND OF THE INVENTION

This invention pertains to corrosion inhibitive pigments and more particularly to those derived from manganomanganic oxide.

The protection of metals with coatings is a complex phenomenon involving the restricted diffusion of water and oxygen to the substrate and the systems influence on surface passivity.

Thick coatings can reduce diffusion significantly but it has been pointed out that even the best systems do not completely prevent the permeation of both water and oxygen to a metal surface. It has also been shown that both the sodium and chloride ions diffuse through coatings providing that the concentration of the salt is at least 0.4 molar. Therefore, the cathodic reaction cannot be surpressed ($\frac{1}{2}O_2 + H_2O + 2e \rightarrow 2OH^-$). In absence of corrosion inhibitive pigment, the corresponding anodic reaction will also take place ($Fe \rightarrow Fe^{++} + 2e$).

Chromium and lead based pigments have been effectively used in corrosion resistant coatings. Their toxicity, however, has resulted in their elimination from many paint formulations. It follows that this toxicity problem also extends to the use of chromium and lead compounds for metal corrosion inhibitors.

It is, therefore, an object of this invention to provide new corrosion inhibitive pigments.

Other objects will become apparent to those skilled in the art upon a reading of the specification.

SUMMARY OF THE INVENTION

Novel corrosion inhibitive pigments have been discovered by sintering manganomanganic oxide, $Mn_3O_4$, with a stoichiometric amount of at least one metallic oxide selected from the group consisting of calcium oxide, zinc oxide, barium oxide, magnesium oxide, strontium oxide and calcium oxide-boron oxide ($CaO \cdot B_2O_3$) at a temperature of about 500° to about 800° C.

The manganomanganic oxide used in this invention may consist essentially of $Mn_3O_4$ or may be a composition or material containing predominately manganomanganic oxide, i.e., greater than about 80% by weight. A particularly good $Mn_3O_4$ containing material for use in preparing the corrosion inhibitive pigments of the invention is a manganomanganic oxide fume. $Mn_3O_4$ fume is produced by sparging a molten bath of ferromanganese at about 1300° C. during a process to reduce the alloy's carbon content. The fume is easily recovered from the exhaust of such furnaces by conventional recovery apparatus.

The data given below outlines some typical characteristics of the manganomanganic oxide fume.

It is essentially $Mn_3O_4$, typically, 90% to 95% by-weight manganomanganic oxide, the balance being a mixture which includes various oxides and silica.
Particle Size: 98% below about 10 microns.

The oxides of calcium, zinc, barium, magnesium, strontium and boron are commercially available materials. The $CaO \cdot B_2O_3$ can be prepared in situ by fluxing a mixture of calcium oxide and boric acid with the manganomanganic oxide. Alternately, calcium hydroxide and/or a boron anhydride can be used in the sintering process.

Although temperatures for the sintering operation of about 500° to about 800° C. can be used, it is preferred to use a range of about 550° to about 600° C.

The compositions of this invention and controls used to compare them with were evaluated for corrosion inhibitive properties by the covered cotton swatch test and by an accelerated test both of which are described below.

Covered Cotton Swatch Test:

The Covered Cotton Swatch Test is a modification of method 6081, Spotting Resistance of Federal Test method No. 141 wherein a 10% dispersion of Pigment was made in distilled or 3% salt water and the dispersions used to saturate cotton swatches which were then placed on cold rolled steel (SAE 1010) and covered with a watch glass to prevent evaporation and subsequent drying out. The area under the swatches were examinated after 24 hr. intervals and notations of the condition of the steel made. The cotton swatches were 0.22 caliber cotton gun patches with a diameter of 2.2 cm. Two layers were used for each test. The watch glasses used to cover the patches had a diameter of 3.5 cm. The steel panels were supplied by Q Panel Company and were 4×12 inches by 0.030 inches thick and known as Q panels. The ground side of the panel was used for the test.

Accelerated Corrosion Test Method:

During active corrosion, an important process is the rate of adsorption or chemisorption of the corrosion inhibitor in steel and its ability to withstand desorption in the presence of a corrosive salt solution. The kinetics of the chemisorption process in a non-aqueous environment during the coating application is another important consideration as is the transport of the corrosion inhibitor through the coating to the substrate and/or defect area. This test determines the effect of various inhibitors during the active corrosion phase. The corrosion process was simulated by using an organic liquid as a model compound for the coating. The model compound used was diphenyl oxide or phenyl ether which is not subject to hydrolysis under alkaline conditions. The method is published as "Corrosion Inhibitor Test Method" by G. Salensky in Corrosion Control By Organic Coatings—Henry Leidheiser, Jr. Ed., National Association of Corrosion Engineers, Published 1981 and described below.

Five ml of the phenyl ether model compound with or without inhibitors is placed in a test tube (250 mm×25 mm). A weighed steel corrosion specimen (40 mm×12 mm×1 mm) is inserted in the test tube which is tipped so that the entire steel surface is wetted. One ml of a 3% sodium chloride solution is then added. The test tube is stoppered with a condenser tube and then placed into a shaker water bath maintained at 40° C. A shaking rate of 250 cycles per minute with a 1.5 inch amplitude provides violent fluidization and aeration of the liquid mixture so that the steel panel is completely wetted at all times. The movement of the condenser tube provides a syphon pumping affect so that fresh air replaces the oxygen consumed during the wet oxidation corrosion process.

Although the shaking period can be prolonged when slower corroding materials such as aluminum are used, it was found that steel specimens only required twenty-four hours for significant results. At the end of the twenty-four hour period, the extent of the corrosion is visually observed and the sample is cathodically stripped of the corrosion product so that it can be weighed and metal loss determined. Samples of the inhibited model compound are run in triplicate. The inhibitor-free model compound is tested in a group of ten specimens to establish a corrosion rate for the system, which is then used to calculate the degree of corrosion and inhibitor efficiency. This is determined by the equation below:

$$\text{Degree of corrosion} = \frac{\% \text{ wt., loss with inhibitor}}{\% \text{ wt., loss without inhibitor}}$$

The degree of protection is equal to 1.0 minus the degree of corrosion. The degree of protection is also referred to herein as the corrosion inhibitive efficiency. The inhibitor efficiency scale shown below was used in these evaluations:
  Inhibitor Efficiency 1.0 = complete protection.
  Inhibitor Efficiency 0.9 = good protection.
  Inhibitor Efficiency 0.0 = same as with no inhibitor.

A heavy duty water shaker manufactured by New Brunswick Scientific Co., Inc., Model RW-650, was used to handle as many as 20 systems or 60 tubes at one time. Steel specimens were cut from unground SAE 1010 panels purchased from Q Panel Co., cleaned with methyl ethyl ketone and dried at 110° C. for 30 minutes, cooled in a desicator and weighed. Test tubes are of the culture rimless type available from Kimble Glass Company.

Diphenyl oxide, perfume grade, was purchased from Dow Chemical Company.

The invention is further described in the examples which follow. All parts and percentages are by weight unless otherwise specified.

EXAMPLE 1

Manganate pigments were prepared by sintering manganomanganic oxide with stoichiometric amounts of zinc oxide at a temperature of about 500° C. The stoichiometry of manganomanganic oxide to zinc oxide is believed to be one mole to one mole, although the chemistry of interaction is unclear. 45.7 Grams of manganomanganic oxide having a mean particle size of 2 microns were mixed with 16.3 grams of zinc oxide having a particle size of 0.2 microns using a high intensity mixer. The charge was placed in a crucible which was heated to 500° C. for 45 minutes in a muffle furnace. The color of the mixture changed from a gray to a light tan color. The sintered mix was then ground to a fine powder in a high intensity mill. The mill used is a Micro Mill sold by the Chemical Rubber Co. Cleveland, Ohio.

The resultant pigment salts obtained by this sintering operation were evaluated by the accelerated corrosion inhibitor test method described above using phenyl ether as the model compound. These pigments were compared with manganomanganic oxide fume alone, zinc oxide alone, and zinc chromate alone. The results are shown below in terms of inhibitors efficiency.

| Inhibitor Efficiency | Pigment |
| --- | --- |
| 0.94 | $Mn_3O_4$ |
| 0.98 | $ZnO \cdot Mn_3O_4$ |
| 0.83 | ZnO |
| 0.99 | Zinc Chromate |

An examination of the inhibitor efficiencies given above demonstrates that the combination of zinc oxide and manganomanganic oxide affords an inhibitor efficiency of 0.98 which is an approximation of zinc chromate. Moreover, the manganomanganic oxide alone gave an inhibitor efficiency of only 0.94 and zinc oxide alone gave an inhibitor efficiency of merely 0.83.

EXAMPLES 2–3

In a similar test evaluation following the procedure described in the example above, calcium oxide based and calcium oxide-boric acid based pigments were prepared and evaluated for inhibitor efficiency. $CaO \cdot H_3BO_3 \cdot 2Mn_3O_4$ may also be written $CaO \cdot \frac{1}{2}B_2O_3 \cdot 2Mn_3O_4$ since boric acid is expected to lose a mole of water during the sintering operation. 68.6 Grams of manganomanganic oxide with a mean particle size of 2 microns were mixed with 8.4 grams of calcium oxide with a 2 micron particle size using a high intensity mixer. It was heated in a crucible at 600° C. for 1 hr. and then milled as in Example 1. Similarly a ratio of 1 mol of calcium oxide, 1 mol of boric acid, and 2 mols of manganomanganic oxide were prepared and sintered at 600° C. for 1 hr. 12.4 Grams of micronized boric acid (2 microns), 5.6 grams of calcium oxide and 45.7 grams of $Mn_3O_4$ were used during the sintering.

| Material | Inhibitor Efficiency |
| --- | --- |
| $CaO \cdot 2Mn_3O_4$ | 0.99 |
| $CaO \cdot H_3BO_3 \cdot 2Mn_3O_4$ | 0.99 |

From these data, it would appear that the mixture of calcium oxide and calcium oxide/boric acid when sintered with manganomanganic oxide gave superior inhibitation results equal to that of zinc chromate.

EXAMPLES 4–6

A series of manganese inhibitor salts was prepared by sintering manganomanganic oxide at 600° C. with zinc oxide, calcium oxide and an equimolar mixture of calcium oxide and boric acid. These salts were compared with manganomanganic oxide alone, zinc oxide alone, zinc yellow and basic zinc chromate. These corrosion inhibitors were tested using a covered cotton swatch test on steel. The cotton swatches were wetted with distilled water or 3% aqueous sodium chloride solution in which was dispersed 10% by weight of either manganomanganic oxide or the pigments prepared in Examples 1, 2 & 3. The results were also compared with other pigments, viz., zinc yellow (zinc chromate), zinc oxide and basic zinc chromate. The distilled water pigment dispersion test ran for 72 hours and the 3% sodium chloride solution pigment dispersion test for 48 hours. The results are shown below.

| Material | Distilled Water (72 Hours) Condition of the steel under the wet swatch | 3% NaCl Solution (48 Hours) Condition of the steel under the wet swatch |
| --- | --- | --- |
| Manganomanganic | Good | Moderate Rust |

| Material | Distilled Water (72 Hours) Condition of the steel under the wet swatch | 3% NaCl Solution (48 Hours) Condition of the steel under the wet swatch |
|---|---|---|
| Oxide $Mn_3O_4$ | | |
| $ZnO.Mn_3O_4$ | Good | Good, with Slight Peripheral Rust |
| Zinc oxide (ZnO) | Heavy Rust | Heavy Corrosion |
| Zinc Yellow (Zinc Chromate) | Light rust in the Middle-Medium Peripheral Rust | Moderate rust plus Peripheral Rust |
| Basic Zinc Chromate | Moderate rust | Moderate Rust |
| $CaO.2Mn_3O_4$ | Good | Good, with slight Peripheral Rust |
| $CaO.H_3BO_3.2Mn_3O_4$ | Good | Good, with slight Peripheral Rust |

Note
Condition is noted under patch. In some cases, the area surrounding or peripheral to the swatch is noted.

These data again confirm the efficacy of the sintered manganomanganic oxide-, zinc oxide, calcium oxide, and boric acid (boron oxide) salts as corrosion inhibitors. $CaO.2Mn_3O_4$, $ZnO.Mn_3O_4$ and $CaO.H_3BO_3.2Mn_3O_4$ are superior to $Mn_3O_4$, ZnO, Zinc yellow (Zinc chromate) and basic zinc chromate particularly when dispersed in a 3% salt solution.

EXAMPLES 7–9

When the previous Examples, i.e., 4–6, were repeated with the exception that magnesium oxide, barium oxide or strontium oxide were sintered with stoichiometric amounts of manganomanganic oxide in place of zinc oxide, calcium oxide or boric acid (boron oxide), comparable corrosion inhibitors are obtained.

Although the invention has been described in its preferred forms with a certain degree of particularity, it will be understood by those skilled in the art that the present disclosure has been made only by way of example and that numerous changes can be made without departing from the spirit and the scope of the invention.

I claim:

1. Method of preparation of corrosion inhibitive pigments which comprises sintering manganomanganic oxide, $Mn_3O_4$, with a stoichiometric amount of at least one metallic oxide selected from the group consisting of calcium oxide, zinc oxide, barium oxide, magnesium oxide, strontium oxide, and an equimolar mixture of calcium oxide and boric acid at a temperature of about 500° to about 800° C.

2. Method claimed in claim 1 wherein the manganomanganic oxide is sintered with zinc oxide.

3. Method claimed in claim 1 wherein the manganomanganic oxide is sintered with calcium oxide.

4. Method claimed in claim 1 wherein the manganomanganic oxide is sintered with an equimolar mixture of calcium oxide and boric acid.

5. Method claimed in claim 1 wherein the manganomanganic oxide is sintered with barium oxide.

6. Method claimed in claim 1 wherein the manganomanganic oxide is sintered with strontium oxide.

7. Method claimed in claim 1 wherein the manganomanganic oxide is sintered with magnesium oxide.

8. A corrosion inhibitive pigment made by the method claimed in claim 1.

9. A pigment according to claim 8 derived from manganomanganic oxide and calcium oxide.

10. A pigment according to claim 8 derived from manganomanganic oxide and an equimolar mixture of calcium oxide and boric acid.

11. A pigment according to claim 8 derived from manganomanganic oxide and zinc oxide.

* * * * *